(12) United States Patent
Hallenstál et al.

(10) Patent No.: US 6,980,544 B2
(45) Date of Patent: Dec. 27, 2005

(54) COMBINING NARROWBAND APPLICATIONS WITH BROADBAND TRANSPORT

(75) Inventors: Magnus Hallenstál, Taby (SE); Tomas Nylander, Stavsnäs (SE); Ros-Marie Furtenback, Johanneshov (SE); Jan Alvar Gjårdman, Farsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 658 days.

(21) Appl. No.: 09/764,622

(22) Filed: Jan. 17, 2001

(65) Prior Publication Data

US 2001/0036158 A1  Nov. 1, 2001

Related U.S. Application Data

(63) Continuation-in-part of application No. 09/353,135, filed on Jul. 14, 1999, now Pat. No. 6,775,266.

(51) Int. Cl.[7] .............................................. H04L 12/66
(52) U.S. Cl. ..................... 370/352; 370/356; 370/384
(58) Field of Search ................... 370/236, 352, 370/395, 397, 231, 260, 257, 248, 410, 427, 370/438, 466, 230, 395.2, 386, 401, 467, 370/395.1, 395.21, 395.61, 369, 353, 354, 370/356, 384, 385, 400, 420, 421, 493, 494, 370/495, 496, 522; 398/59; 710/31

(56) References Cited

U.S. PATENT DOCUMENTS

| | | | |
|---|---|---|---|
| 5,040,170 A | 8/1991 | Upp et al. | |
| 5,416,773 A * | 5/1995 | Gamm ........................ 370/369 |
| 5,422,882 A * | 6/1995 | Hiller et al. ................ 370/352 |
| 5,426,636 A * | 6/1995 | Hiller et al. ................ 370/352 |
| 5,483,527 A | 1/1996 | Doshi et al. ............... 370/60.1 |
| 5,568,475 A | 10/1996 | Doshi et al. |
| 5,592,477 A | 1/1997 | Farris et al. |
| 5,696,761 A * | 12/1997 | Kos et al. .................... 370/386 |
| 5,757,793 A | 5/1998 | Read et al. |
| 5,802,045 A * | 9/1998 | Kos et al. .................... 370/352 |
| 5,828,655 A * | 10/1998 | Moura et al. ............... 370/236 |
| 5,896,377 A * | 4/1999 | Boot et al. .................. 370/352 |
| 5,917,815 A * | 6/1999 | Byers et al. ................ 370/352 |
| 5,930,253 A * | 7/1999 | Brueckheimer et al. ..................... 370/395.61 |
| 5,999,525 A | 12/1999 | Krishnaswamy et al. |
| 6,002,689 A * | 12/1999 | Christie et al. ............. 370/401 |
| 6,023,465 A * | 2/2000 | Brueckheimer et al. .... 370/386 |
| 6,041,109 A | 3/2000 | Cardy et al. ................ 379/201 |
| 6,128,295 A | 10/2000 | Larsson et al. ............. 370/389 |
| 6,154,467 A * | 11/2000 | Hager et al. ................ 370/467 |
| 6,195,714 B1 * | 2/2001 | Li et al. ....................... 710/31 |

(Continued)

FOREIGN PATENT DOCUMENTS

WO    WO 98/28884    7/1998

(Continued)

*Primary Examiner*—Phirin Sam

(57) ABSTRACT

The combination of narrowband applications with broadband transport is enabled by combining a first node having narrowband ability with a second node having broadband ability in which call control functionality of the first node is provided to the second node. Both the first node and the second node have connection control functionality for switching data information of a given call. However, the broadband second node receives signaling information from the narrowband first node, which has call control functionality, over one or more links to enable the second node to switch a call in accordance with determined call control instructions. The combination of the narrowband first node and the broadband second node results in a hybrid switch that is capable of operating with both synchronous transfer mode (STM) networks and asynchronous transfer mode (ATM) networks.

21 Claims, 12 Drawing Sheets

U.S. PATENT DOCUMENTS

| | | | |
|---|---|---|---|
| 6,456,629 B1 * | 9/2002 | Bjorkqvist et al. | 370/466 |
| 6,519,257 B1 * | 2/2003 | Brueckheimer et al. | 370/395.2 |
| 6,535,483 B1 * | 3/2003 | Christie et al. | 370/230 |
| 6,563,918 B1 * | 5/2003 | Nelson et al. | 379/230 |
| 6,744,768 B2 * | 6/2004 | Vikberg et al. | 370/395.21 |
| 2003/0016675 A1 * | 1/2003 | Underwood | 370/395.1 |

FOREIGN PATENT DOCUMENTS

| | | |
|---|---|---|
| WO | WO 99/13679 | 3/1999 |
| WO | WO 01 05108 | 1/2001 |

* cited by examiner

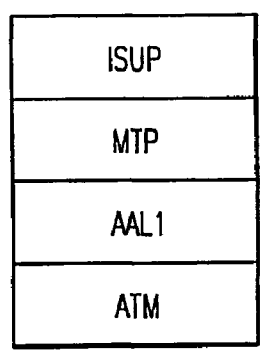
FIG. 3D
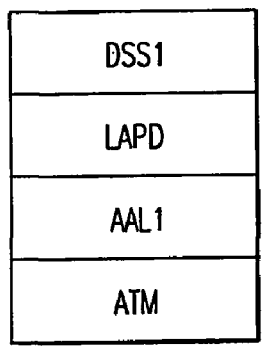   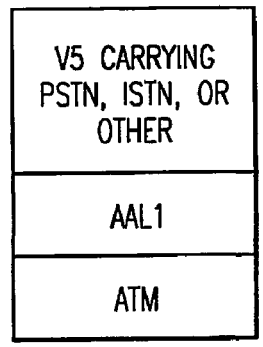   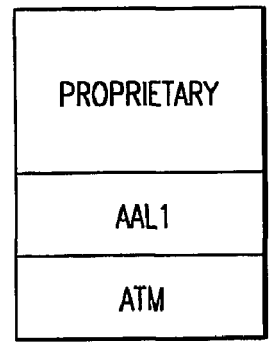
FIG. 3E   FIG. 3F   FIG. 3G

COMBINING NARROWBAND APPLICATIONS WITH BROADBAND TRANSPORT

CROSS-REFERENCES TO RELATED APPLICATIONS

This Nonprovisional Application for Patent is a Continuation-in-Part of U.S. Nonprovisional Application for Patent Ser. No. 09/353,135, filed on July 14, 1999 now U.S. Pat. No. 6,775,266. U.S. Nonprovisional Application for Patent Ser. No. 09/353,135 is hereby incorporated by reference in its entirety herein.

This Nonprovisional Application for Patent is related by subject matter to U.S. Nonprovisional Applications for Patent Nos. 09/765,119, 09/764,960 and 09/764,953, all of which are filed on Jan. 17, 2001. These U.S. Nonprovisional Applications for Patent Nos. 09/765,119, 09/764,960 and 09/764,953, are hereby incorporated by reference in their entirety herein.

BACKGROUND OF THE INVENTION

1. Technical Field of the Invention

The present invention relates in general to the field of communications, and in particular, by way of example but not limitation, to using broadband transport for narrowband telephony and data communications.

2. Description of Related Art

The increasing interest for high band services such as multimedia applications, video on demand, video telephone, and teleconferencing has motivated development of the Broadband Integrated Service Digital Network (B-ISDN). B-ISDN is based on a technology known as Asynchronous Transfer Mode (ATM) and offers considerable extension of telecommunications capabilities.

ATM is a packet-oriented transfer mode which uses asynchronous time division multiplexing techniques. The packets are called cells and traditionally have a fixed size. A traditional ATM cell comprises 53 octets, five of which form a header and 48 of which constitute a "payload" or information portion of the cell. The header of the ATM cell includes two quantities that are used to identify a connection in an ATM network over which the cell is to travel. These two quantities include the Virtual Path Identifier (VPI) and the Virtual Channel Identifier (VCI). In general, a virtual path is a principal path defined between two switching nodes of the network; a virtual channel is one specific connection on the respective principal path.

At its termination points, an ATM network is connected to terminal equipment, e.g., ATM network users. In between ATM network termination points, there are typically multiple switching nodes. The switching nodes have ports which are connected together by physical transmission paths or links. Thus, in traveling from an originating terminal equipment to a destination terminal equipment, ATM cells forming a message may travel through several switching nodes and the ports thereof.

Of the multiple ports of a given switching node, each may be connected via a link circuit and a link to another node. The link circuit performs packaging of the cells according to the particular protocol in use on the link. A cell that is incoming to a switching node may enter the switching node at a first port and exit from a second port via a link circuit onto a link connected to another node. Each link can carry cells for multiple connections, with each connection being, e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message to travel from an ingress side/port of the switch to an egress side/port of the switch. The message can therefore ultimately travel from the originating terminal equipment to the destination terminal equipment.

While ATM, because of the high speed and bandwidth that it offers, is envisioned as the transport mechanism for more advanced services such as B-ISDN, it nevertheless must be recognized that the current narrowband networks (e.g., Public Switched Telephone Networks (PSTN), ISDN, etc.) will remain in use (at least in part) for quite some time. It has taken decades for the present voice switched telephony networks (e.g., PSTN, ISDN, etc.) to reach their present advanced functionalities. While ATM networks are being built, the ATM networks will likely not easily acquire all the functionalities of advanced voice communication. Therefore, at least initially, ATM networks/nodes will in some instances be added to parts or will replace parts of circuit switched telephony networks. In such instances, ATM will be used for transport and switching. ATM can actually be used as a single transport and switching mechanism for multiple other networks, including multiple other different types of networks. For example, a single ATM network can be used to transport and switch communications from mobile networks (e.g., Public Land Mobile Networks (PLMNs)), Internet protocol (IP)-based networks (e.g., the Internet), etc., as well as landline networks such as PSTNs and ISDNs.

U.S. Pat. Nos. 5,568,475 and 5,483,527 to Doshi et al., for example, incorporate ATM switches for routing telephony voice signals between Synchronous Transfer Mode (STM) nodes. The ATM switches use a signaling system No. 7 (SS#7) network to establish a virtual connection, rather than a circuit switched connection, as would be the case in pure STM network. The signaling system No. 7 (SS#7) network of U.S. Pat. Nos. 5,568,475 and 5,483,527 includes signal transfer points (STPs) that are connected by special physical links to each of the ATM switch nodes. For call setup, for example, signaling messages are relayed through the non-ATM signaling system No. 7 (SS#7) network. In such relaying, a non-ATM STP receives the signaling message and advises its associated ATM node of the call setup. The associated ATM node may then identify idle resources to be used for forwarding voice signals to the next ATM node once the call has been setup, and it may prepare its own signaling message to be used in the relay.

The signaling message for the relay that is prepared by the ATM node is returned to its associated STP, which forwards the signaling message via the signaling system No. 7 (SS#7) network to another STP associated with the next ATM node. Such relaying continues until the signaling message reaches an STP of an STM local exchange carrier (LEC). Once the call has been set up, the ensuing speech (or voice-band data) is transported via the ATM nodes. STM/ATM terminal adapters are situated between the STM network and the ATM network for packing samples of voice signals as received from the STM network into ATM cells for application to the ATM network, and for unpacking ATM cell payloads to obtain voice signals for application to the STM network from the ATM network. The incorporation of ATM into an STM network in the particular manner as described above thus involves a non-ATM signaling network alongside the ATM nodes. Furthermore, each STP node associated with an ATM node performs only call control functions in the network of Doshi et al. Otherwise and in general, call control and connection control is traditionally combined in conventional communication nodes.

With reference now to FIG. 1A, a conventional unified communications node is illustrated at 100. The conventional unified communications node 100 may represent any general purpose switching node in a telecommunications network such as a PSTN. Within the conventional communications node 100, the call control 105 functions and the connection control 110 functions are united. The call control 105 and the connection control 110 functions together encompass the entire seven (7) layers of the Open System Interconnection (OSI) protocol. These seven (7) layers are denoted as the physical, data link, network, transport, session, presentation, and application layers. Accordingly, the conventional communications node 100 may perform all functions related to both switching intelligence and switching fabric. Conventional communication nodes 100 are not, however, capable of handling the interworking between (i) narrowband telephony and data communications and (ii) broadband communications using faster and higher bandwidth networks, such as ATM networks.

With reference now to FIG. 1B, a conventional approach to separating functions of the conventional unified communications node of FIG. 1A is illustrated generally at 150. Conventional approaches attempt to meet the stringent demands of interworking narrowband telephony and data communications with broadband networks using ATM by separating control functions. Specifically, call control 155 functions are separated from connection control 160 functions. The call control 155 functions are thereby made independent of any particular set of connection control 160 functions. This separation is typically accomplished by utilizing a conventional communications node (such as the conventional communications node 100 of FIG. 1A) that is stripped of its switching intelligence, leaving only the connection control 160. In effect, a conventional communications node 100 is modified by removing or rendering inoperative the call control 105 functions, thus leaving only the connection control 110 functions. This modified conventional communications node is substituted as the connection control 160 part. The call control 155 part, on the other hand, is typically designed and created without relying on traditional telecommunications hardware or software.

With reference now to FIG. 2, an existing scheme for utilizing a broadband network in conjunction with nodes corresponding to separated functions of a conventional unified communications node is illustrated generally at 200. Switching intelligence 205A,205B parts are connected to switching fabric 210A,210B parts. The switching fabric 210A,210B parts are connected to the ATM network 215, and they effect required emulation and cell packing for interworking a narrowband network (not shown) with the ATM network 215. The switching intelligence 205A,205B parts are usually realized with a UNIX-based server. The switching intelligence 205A,205B parts are intended to provide the advanced calling services and features (e.g., those traditionally provided by the Intelligence Network (IN)). The switching intelligence 205A,205B parts do not include any switching fabric resources, so they must rely on the switching fabric 210A,210B parts for these resources.

Because the switching intelligence 205A,205B parts do not have any of their own switching fabric resources, they are not directly connected to any transport mechanisms, nor do they include the requisite interface(s) for doing so. Incoming calls are therefore received at a switching fabric 210 part and managed by the associated switching intelligence 205 part. When an incoming call is received at a switching fabric 210 part, call signaling information is sent to the switching intelligence 205 part. The switching intelligence 205 part performs the appropriate call control functions and sends instructions (e.g., in the form of call signaling information) to the switching fabric 210 part. The switching fabric 210 part follows the instructions by making the appropriate connections (e.g., to/through the ATM network 215, to/through a narrowband network (not shown), etc.) for forwarding the call data information for the incoming call. As such, no call data information is (or can be) sent to the switching intelligence 205 part, including from the switching fabric 210 part.

Furthermore, while UNIX-based servers, which realize the switching intelligence 205 parts, may be designed to operate at high speeds, they suffer from a number of deficiencies. First, significant research, design, and testing is required to produce appropriate software code to run the UNIX-based servers as switching intelligence 205 parts. Existing circuit-switched voice telephony networks include many advanced features that require many lines of code that have been gradually developed, tested, and implemented over many years. Duplicating the diverse number and types of features while maintaining the required level of reliability and service using newly written code on a UNIX server is not only a daunting task, but it is also virtually impossible to achieve quickly. Second, it is extraordinarily difficult to migrate gradually from traditional network architectures (e.g., those using the conventional unified communications node 100 of FIG. 1A) to next generation networks that rely on broadband transport mechanisms when deploying nodes with only the switching intelligence 205 part. System operators are essentially forced to simultaneously replace whole portions of their networks in large chunks. The consequential large capital expenditures are naturally undesirable to system operators.

SUMMARY OF THE INVENTION

The deficiencies of the prior art are overcome by the methods, systems, and arrangements of the present invention. For example, as heretofore unrecognized, it would be beneficial to re-use and/or extend the life of existing switches when combining narrowband networks with broadband transport mechanisms. In fact, it would be beneficial to utilize existing switches to enable a gradual migration from narrowband networks to broadband transport mechanisms via the implementation of hybrid switches.

The present invention is directed to employing first and second nodes in a communications system to combine narrowband and broadband transport mechanisms. The first node includes call control and connection control functions while the second node includes connection control functions. The second node may rely on the call control functions of the first node in order to initiate, complete, and/or forward connections in the communications system. In effect, in certain embodiment(s), the first and second nodes may function as a single logical node within the communications system. The first node may provide call control functions to the second node by exchanging signaling information over one or more links between the first and second nodes.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the methods, systems, and arrangements of the present invention may be had by reference to the following detailed description when taken in conjunction with the accompanying drawings wherein:

FIG. 3D illustrates a diagrammatic view of an exemplary protocol between two elements of the network of the embodiment(s) of the invention that include hybrid node pairs;

FIGS. 3E, 3F, and 3G illustrate diagrammatic views of alternate exemplary protocols between two elements, a first of the network elements having a hybrid node pair in accordance with embodiment(s) of the invention and a second of the network elements being an access node with an additional ATM interface having circuit emulation;

DETAILED DESCRIPTION OF THE DRAWINGS

Figure 1A:
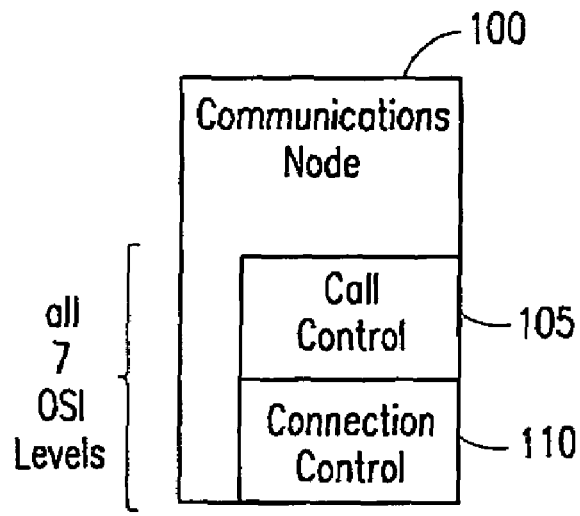
FIG. 1A illustrates a conventional unified communications node.
Figure 1B:
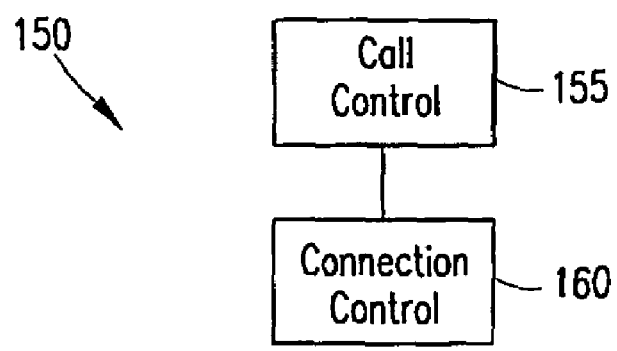
FIG. 1B illustrates a conventional approach to separating functions of the conventional unified communications node of FIG. 1A.
Figure 2:
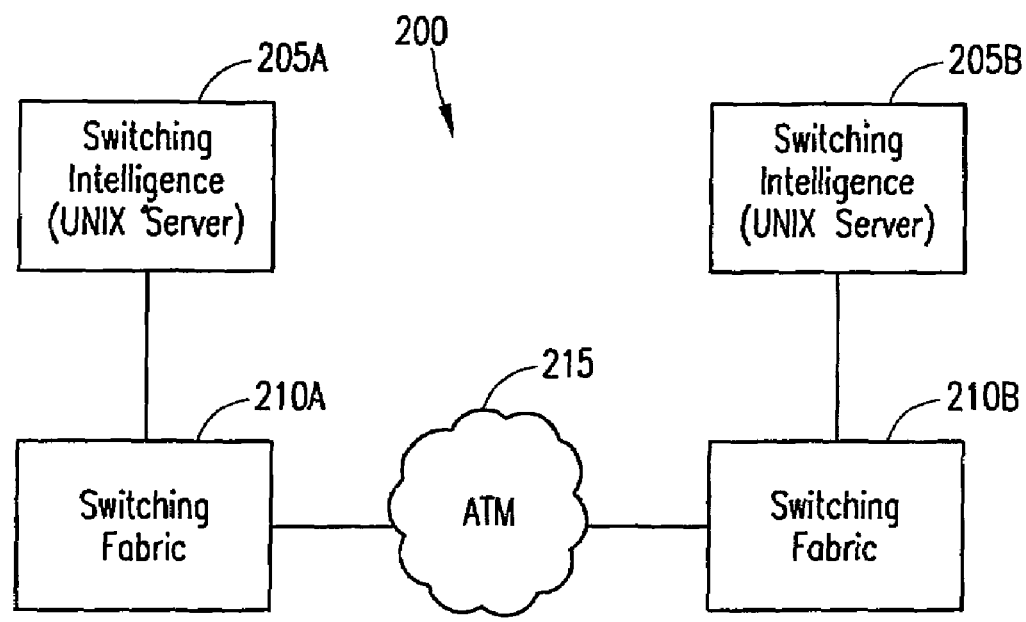
FIG. 2 illustrates an existing scheme for utilizing a broadband network in conjunction with nodes corresponding to separated functions of a conventional unified communications node.

In the following description, for purposes of explanation and not limitation, specific details are set forth, such as particular architectures, interfaces, circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1A–7 of the drawings, like numerals being used for like and corresponding parts of the various drawings.

In certain embodiments in accordance with the invention (e.g., including embodiment(s) of the invention of the parent application), ATM is used as a transport and switching mechanism in a hybrid STM/ATM network, while the signaling remains normal narrowband signaling. The narrowband signaling may be transported on permanent paths over ATM connections, and the narrowband speech channels may be transported on ATM and switched on a "per call basis" (e.g., on-demand) through an ATM switch.

The hybrid STM/ATM network has an access node which services narrowband terminals and which generates a signaling message in connection with call setup. A translator formats the first signaling message into ATM cells so that the first signaling message can be routed through an ATM switch to a circuit switched (e.g., STM) node. The circuit switched node (e.g., PSTN/ISDN) sets up a physical connection for the call and generates a further signaling message for the call, the further signaling message pertaining to the physical connection. The ATM switch routes an ATM-cell-formatted version of the further signaling message to another ATM switch over an ATM physical interface. Thus, the ATM switch switches both narrowband traffic and signaling for the call over the ATM physical interface. The ATM physical interface thus carries an ATM-cell-formatted version of the further signaling message amidst ATM traffic cells.

In view of the fact that the circuit switched node and the ATM switch employ different parameters (e.g., b-channel, etc., for the STM node and VP/VC for the ATM switch), in one embodiment the STM node obtains global position numbers (GPN) for use in setting a path for the further signaling message through the ATM switch. In this regard, at the circuit switched node a translation is made from STM to GPN using an STM/GPN translation table; at the ATM node a translation is made from GPN to VP/VC/port using a GPN/ATM translation table.

The ATM-cell-formatted version of the further signaling message is transported over the ATM physical link and ultimately reaches a destination access node which serves a destination terminal. A destination translator unpacks ATM cells carrying the ATM-cell-formatted version of the further signaling message to obtain the STM signaling information for use by the destination access node. The translators may be situated at the access node, for example. In illustrated embodiment(s), the ATM switches are situated at nodes distinct from the PSTN/ISDN nodes, but such need not be the case in other embodiment(s). The signaling messages can be in accordance with the signaling system no. 7 (SS#7) convention, and the further signaling message can be one of an ISUP or a TUP message, for example.

Figure 3:
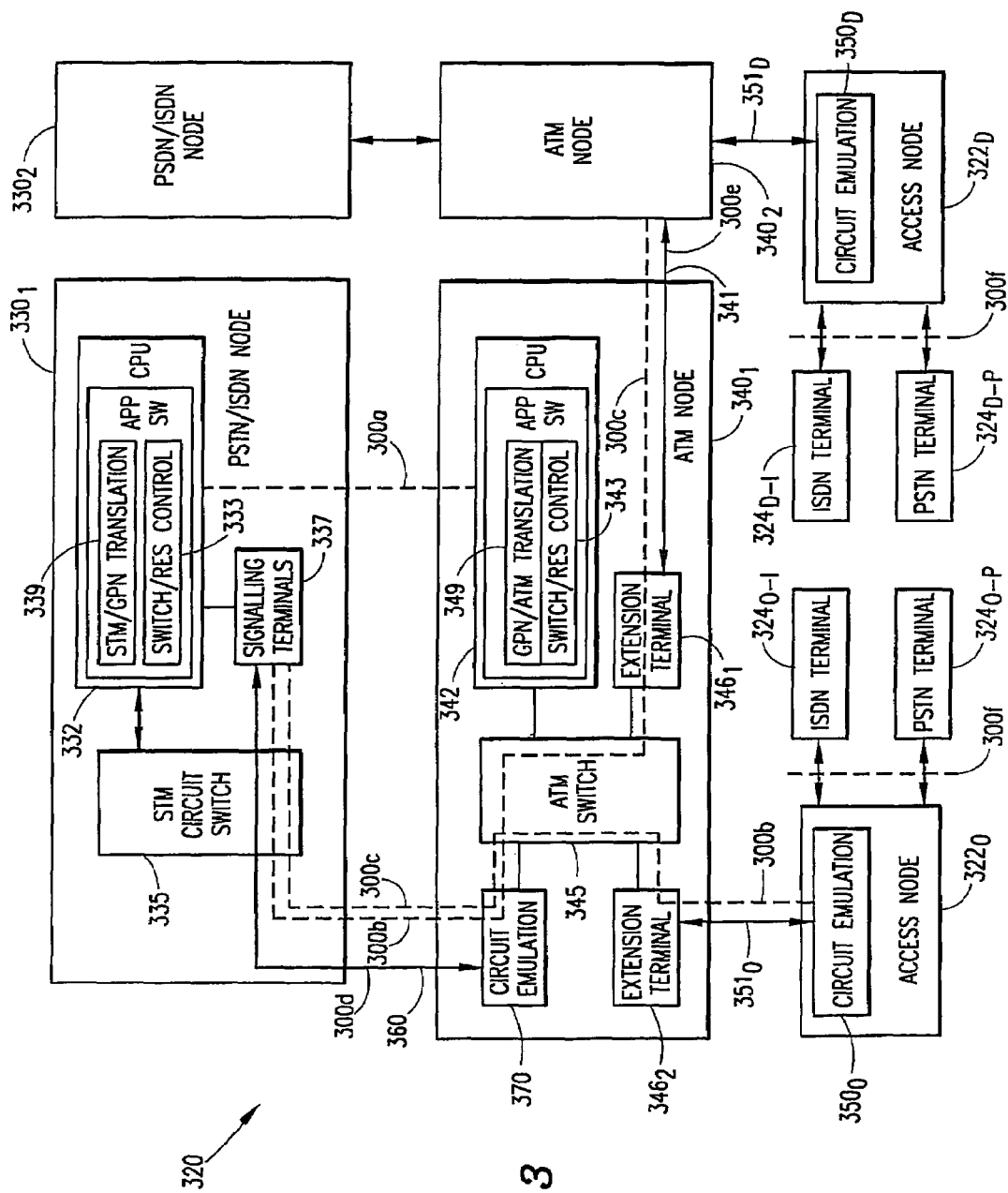
FIG. 3 illustrates an exemplary schematic view of a hybrid STM/ATM network according to an embodiment of the invention.

Referring now to FIG. 3, an exemplary hybrid STM/ATM network 320 according to an embodiment of the invention is illustrated. Narrowband terminal devices communicate with hybrid STM/ATM network 320 through access nodes, such as access node $322_O$ and access node $322_D$. For example, FIG. 3 shows terminals $324_O$ connected to access node $322_O$, particularly ISDN terminal $324_{O-I}$ and PSTN terminal $324_{O-P}$. Similarly, access node $322_D$ has access terminals $324_D$ connected thereto, namely ISDN terminal $324_{D-I}$ and PSTN terminal $324_{D-P}$. Of course, a differing (and most likely greater) number of terminals can be connected to each access node 322, but for simplicity only two such terminals are shown for exemplary purposes in FIG. 3. It should be noted that, as used herein, the term "access node" is not limited to a simple node used merely for connecting subscriber lines, for it may encompass other nodes such as a local exchange (LE) node, for example.

The hybrid STM/ATM network 320 of FIG. 3 comprises one or more STM nodes, also known as PSTN/ISDN nodes 330. While only two such PSTN/ISDN nodes $330_1$ and $330_2$ are shown in FIG. 3 for sake of illustration, it should be understood that the invention is not limited to only two such nodes. The structure and operation of conventional PSTN/ISDN nodes 330 are well known; such as those typified by utilization of Ericsson AXE switches, for example. Therefore, only selected pertinent portions of conventional PSTN/ISDN nodes 330 are described herein with reference to PSTN/ISDN node $330_1$. For example, PSTN/ISDN node $330_1$ has processor(s) 332 which execute, e.g., node application software including switch and resource control software 333. Such software is used to control STM circuit switch 335 as well as signaling terminals 337 which comprise PSTN/ISDN node $330_1$. Other details of the structure and operation of a conventional PSTN/ISDN node are understood, for example, from U.S. patent application Ser. No. 08/601,964 for "Telecommunications Switching Exchange", which is hereby incorporated by reference in its entirety herein.

The STM/ATM network 320 of certain embodiment(s) of the invention is considered a hybrid network in view of the fact that ATM nodes 340 are also included therein. As explained hereinafter, the ATM nodes 340 are used not only to route narrowband traffic between access nodes 322, but also for transport of signaling in ATM cells over an ATM physical interface. In the illustrated example, the ATM network aspect includes two exemplary ATM nodes, particularly ATM node $340_1$ and ATM node $340_2$, which are connected by ATM physical interface or link 341. Again, it should be understood that the ATM component can (and typically does) comprise a greater number of ATM nodes, with the nodes being connected by ATM physical links.

In hybrid network 320, a PSTN/ISDN node 330 and a ATM node 340 can be paired together in the manner illustrated in FIG. 3. With such a pair, the PSTN/ISDN node 330 and ATM node 340 are collectively referred to as hybrid node pair 330/340. The network 320 of certain embodiment(s) of the invention thus can comprise any number of hybrid node pairs 330/340. An ATM node such as ATM node 340 takes on differing configurations, but commonly has a main processor 342 or the like which executes application software including switch and resource control software as generally depicted by 343 in FIG. 3. The heart of an ATM node is usually the ATM switch core or switch fabric, which for the illustrated embodiment is shown as ATM cell switch 345 in FIG. 3. Further information regarding an exemplary ATM switch is provided by U.S. patent application Ser. No. 08/188,101, entitled "Asynchronous Transfer Mode Switch", filed Nov. 9, 1998, which is hereby incorporated by reference in its entirety herein. ATM cell switch 345 has plural ingress ports and plural egress ports, with at least some of such ports having a device board attached thereto.

Each device board at ATM node 340 can have one or more different functions performed thereby or one or more different devices mounted thereon. For example, one of the device boards attached to a port of ATM cell switch 345 can, in one embodiment, have the main processor 342 mounted thereon. Other device boards may have other processors, known as "board processors". Some device boards serve as extension terminals (ETs) 346 which may be used to connect the ATM node to other nodes. For example, the ATM physical link 341 shown in FIG. 3 has a first end connected to an extension terminal ET $346_1$ of ATM node $340_1$, while a second end of ATM physical link 341 is connected to an unillustrated extension terminal ET of ATM node $340_2$. The device boards connected to ATM cell switch 345 of ATM node 340 are not specifically illustrated in detail in FIG. 3, but the structure and operation of such device boards is understood with reference to (for example) the following United States Patent Applications, all of which are hereby incorporated by reference in their entirety herein: U.S. patent application Ser. No. 08/893,507 for "Augmentation of ATM Cell With Buffering Data"; U.S. patent application Ser. No. 08/893,677 for "Buffering of Point-to-Point and/or Point-to-Multipoint ATM Cells"; U.S. patent application Ser. No. 08/893,479 for "VPNC Look-Up Function"; U.S. patent application Ser. No. 09/188,097 for "Centralized Queuing For ATM Node", filed Nov. 9, 1998.

As explained hereinafter, signaling (eg., for call setup) is routed from an access node 322 through an ATM node 340 to an appropriate one of the PSTN/ISDN nodes 330. Such being the case, a circuit emulation or translator 350 is provided for each access node 322 which communicates with an ATM node 340. The translators 350 serve, e.g., to encapsulate signaling information from the access node 322 into ATM cells for signaling directed toward an ATM node 340, and conversely unpack ATM payloads received from an ATM node 340 to extract signaling information for use by the access node 322. In the illustrated embodiment, the translators 350 are preferably provided at or proximate to their associated access nodes 322. That is, translator 350.sub.O may be situated at or included in access node 322.sub.O; translator 350.sub.D may be situated at or included in access node 322.sub.D. A pair or physical links, shown as links 351, are provided for connecting each access node 322 to a corresponding one of the ATM nodes 340.

ATM node 340 is connected to a PSTN/ISDN node 330 by a physical link 360. With reference to ATM node $340_1$, for example, a pair of switch-to-switch links 360 is employed to connect ATM cell switch 345 (through its circuit emulation board 370) to STM circuit switch 335 of PSTN/ISDN node 330, for the carrying of signaling messages. One of the links in pair 360 carries messages from ATM cell switch 345 (after translation at circuit emulation board 370) to STM circuit switch 335, the other link of the pair 360 carries messages in the reverse direction.

In the illustrated embodiment, a dedicated VPI, VCI internal to ATM cell switch 345 is used for signaling. Thus, with reference to ATM node $340_1$, for example, link $351_O$ is connected to extension terminal (ET) $346_2$, which in turn is connected to a first pair of dedicated ports of ATM cell switch 345. Signaling messages received at ATM node $340_1$ which are destined to PSTN/ISDN node $330_1$ are routed on the dedicated internal VPI/VCI to a port of ATM cell switch 345 which ultimately connects (via circuit emulator 370) to switch-to-switch links 360. However, since the signaling routed through ATM cell switch 345 is encapsulated in ATM cells, a translation to the STM signaling must be performed prior to transmitting the signaling information on switch-to-switch links 360. For this reason, a device board connected to switch-to-switch links 360 has the circuit emulation (CE) or translator 370 mounted thereon.

The circuit emulation (CE) or translator 370 serves to unpack signaling information which is destined to PSTN/ISDN node 330, but contained in ATM cells, so that the signaling information can be extracted from the ATM cells prior to application on switch-to-switch links 360. Conversely, signaling information received from PSTN/ISDN node $330_1$ on switch-to-switch links 360 at translator 370 is encapsulated into ATM cells for routing through ATM node $340_1$. From FIG. 3 it can also be seen that a plurality of interfaces 300a–300f are utilized in the hybrid STM/ATM network 320 of certain embodiment(s) of the invention. These interfaces are described below, primarily with reference to the exemplary nodes (e.g., PSTN/ISDN node $330_1$ and ATM node $340_1$).

Interface 300a is a logical interface which exists between processor(s) 332 of PSTN/ISDN node $330_1$ and main processor(s) 342 of ATM node $340_1$. Interface 300a enables PSTN/ISDN node 330 to control the ATM node 340 connected thereto. That is, with the signaling carried by interface 300a, PSTN/ISDN node $330_1$ can order physical connections which are to be set up in ATM node $340_1$. Interface 300a can be a proprietary interface or an open interface (such as a General Switch Management Protocol (GSMP) interface [see Request For Comments (RFC) 1987]). Logical interface 300a can be carried on any physical interface, such as interface 360 described below. Alternatively, interface 300a can be carried by a separate link (e.g., between processors 332 and 342), or carried on top of IP/Ethernet links.

Interface 300b is the signaling between the PSTN/ISDN nodes 330 and the access node 322 connected thereto. Interface 300b is carried on one or more semipermanent connections through the STM circuit switch 335; through the interworking unit with circuit emulation 370 into ATM cell switch 345; and over permanent virtual connections to access node 322 (particularly to translator 350 in access node 322, where it is emulated back and terminated). As mentioned above, translator 350 is employed to encapsulate the narrowband signaling from an access node 322 in ATM cells for use by an ATM node 340, and conversely for unpacking ATM cells with signaling information for use by an access node 322. Each STM channel on the user side may have a corresponding VPI/VCI on interface 300b.

Interface 300c is the non-broadband signaling that is carried through and between the nodes. Interface 300c thus carries the normal signaling system No. 7 (SS#7) interface (e.g., TUP or ISUP) which is transparently carried in ATM-cell-formatted versions of signaling messages over ATM physical link 341. In PSTN/ISDN node 330, the signaling terminals 337 are used for common channel signaling. In at least one embodiment, signaling terminals 337 can be pooled devices situated at STM circuit switch 335. Alternatively, the signaling terminals 337 can be connected directly to the interfaces between the STM and ATM switches.

Interface 300d is the physical interface provided by switch-to-switch link 360. Interface 300d can be used to carry speech for a call to and from an STM network, and also to carry the signaling of interface 300b and interface 300c as described herein. In addition, interface 300d can also be used to link-in special equipment that is to be connected to a normal circuit switch (e.g., conference equipment, answering machines, etc.). Interface 300d can be realized by any standard physical media, such as E1, for example; it being understood that STM-1 or similar speeds may be suitable. The physical interface 300d can also carry the voice data for a conversation between any of the terminals shown in FIG. 3 and an unillustrated terminal connected to the circuit switched network, in which situation the hybrid node pair 330/340 acts as a gateway.

Interface 300e is the ATM physical link 341 to other ATM nodes. Any standard link for ATM may be employed for interface 300e. A dedicated VP/VC is employed to transparently transfer the signaling system no. 7 (SS#7) signaling between PSTN/ISDN nodes 330 over interface 300e. Interface 300f, shown in FIG. 3 as connecting each access node 322 with its terminals, is a typical user-network interface (e.g., ISDN, BA/BRA, PRA/PRI, two-wire PSTN, etc.)

For two traditional circuit switched PSTN/ISDN nodes to communicate with one another using protocols such as ISUP or TUP, it is preferable that ISUP entities in both PSTN/ISDN nodes have coordinated data tables. In this regard, each of the two PSTN/ISDN nodes has a table which translates a CIC value onto a same timeslot in a same physical interface connecting the two PSTN/ISDN nodes. Thus, a CIC value (together with a point code) represents a particular timeslot on a particular physical link. One specific CIC preferably points out the same time slot in the tables of both PSTN/ISDN nodes. In other words, the data tables of the two PSTN/ISDN nodes are preferably coordinated.

The need to coordinate the data tables of PSTN/ISDN node $330_1$ and PSTN/ISDN node $330_2$ for ISUP/TUP similarly exists in certain embodiment(s) of the invention. If two hybrid nodes $330_1/340_1$ and $330_2/340_2$ have a communication channel set up between them, by means of a semipermanent connection carrying SS#7 signaling for example, the translation tables 339 in both hybrid nodes are preferably coordinated from the standpoint of using CIC. This typically means that in both hybrid nodes $330_1/340_1$ and $330_2/340_2$ a certain CIC points at the same VP and VC (and possibly AAL2 pointer) identifying cells on a certain physical link (e.g., link 341) connecting the two hybrid nodes. Alternatively, the same objective may be accomplished by other suitable means such as a cross-connected-ATM switch positioned between the hybrid nodes that switches packets and gives the packets the VP and VC value understood by the other node.

Figure 3A:
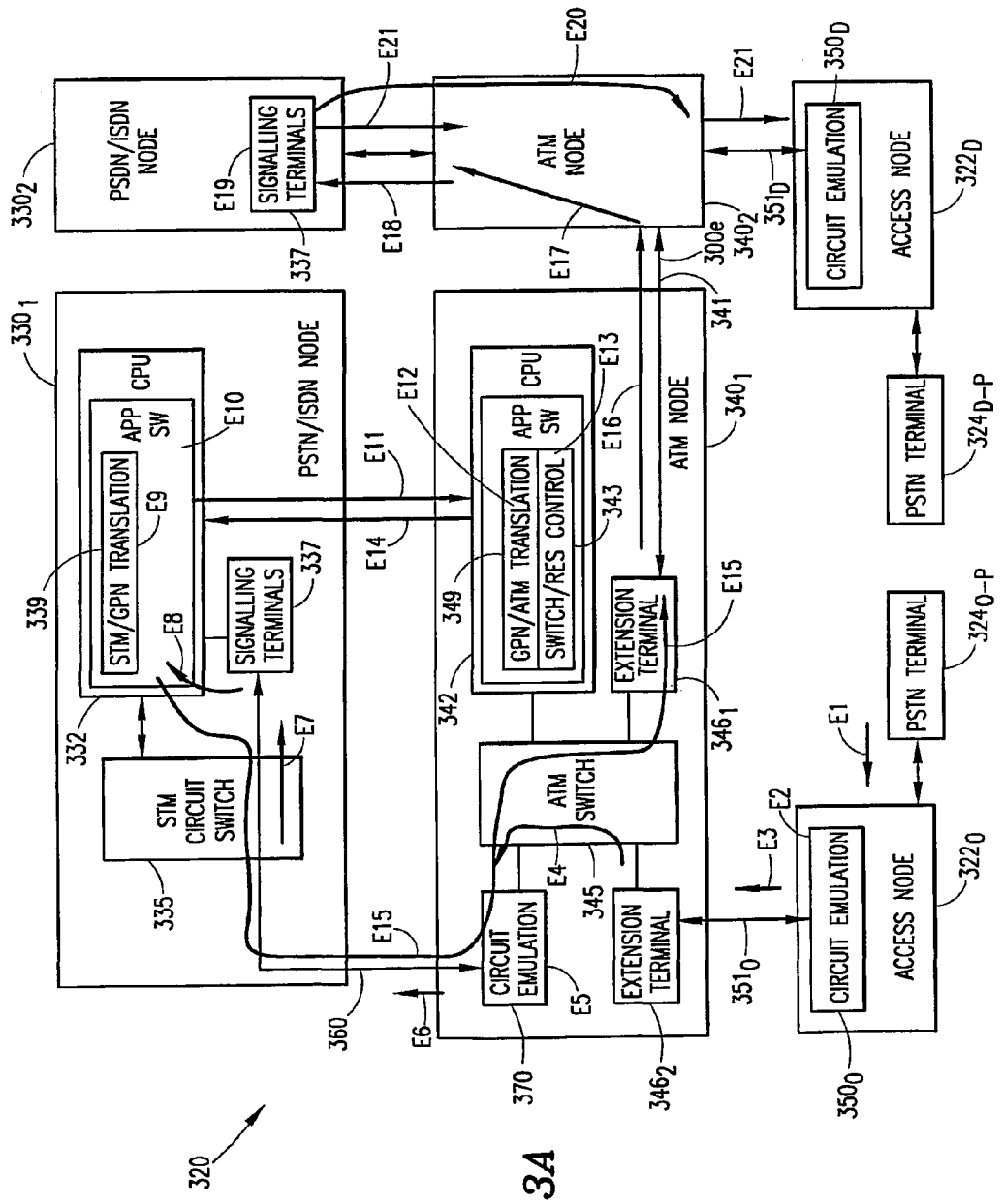
FIG. 3A illustrates an exemplary schematic view of selected portions of the hybrid STM/ATM network of FIG. 3, and further showing various operational events.

Referring now to FIG. 3A, an exemplary structure of hybrid STM/ATM network 320, having omitted therefrom various items including the interfaces, is illustrated. FIG. 3A also provides an example of signal processing for a call originating at terminal $324_{O-P}$ for which the called party number (destination) is terminal $324_{D-P}$. As shown by the arrow labeled E-1, at event E-1 a SETUP message is sent from terminal $324_{O-P}$ to access node $322_O$. In the illustrated embodiment, the SETUP message is an IAM message for an ISUP network interface, and is for a 30B+D PRA and for VS.x carried on a 64 kb/s bit stream in a circuit switched timeslot.

At the translator $350_O$ associated with the access node $322_O$, at event E-2 the signaling from terminal $324_{O-P}$ is converted from STM to ATM by packing the signaling information into ATM cell(s). In this regard, after the circuit emulation a table is employed to translate from a 64 kb/s speech channel from terminal $324_{O-P}$ to a corresponding ATM address (VP/VC). The signaling of the SETUP message, now encapsulated in ATM cell(s), is applied to link $351_O$ and transmitted to ATM cell switch 345 of ATM node $340_1$ as indicated by event E-3. As further indicated by event E-4, the ATM cell(s) containing the SETUP message signaling is routed through the ATM cell switch 345 in accordance with a switch internal VP/VC dedicated for STM-originated signaling. Upon egress from ATM cell switch 345, the signaling information for the SETUP message is retrieved from the ATM cell(s) by translator 370 (event E-5), and it is reconverted at translator 370 from ATM to STM format, so that the SETUP message signaling information can be applied in STM format at event E-6 to switch-to-switch link 360. The SETUP message, now again in STM format, is routed through STM circuit switch 335 (as indicated by event E-7) to an appropriate one of the signaling terminals 337. Upon receipt of the SETUP message signaling information at the appropriate signaling terminal 337, the signaling information is forwarded to processor(s) 332 of PSTN/ISDN node 330, which engage in STM traffic handling (as indicated by event E-8).

In its traffic handling, the processor 332 of PSTN/ISDN node 330 realizes that the incoming side of the call and the outgoing side of the call have physical connections through an ATM node. In this regard, when the access points of the connection were defined (subscriber or network interface), a bearer type was associated with the connection and stored in application software. In the present scenario, when the SETUP message (e.g., an IAM message in the case of an ISUP network interface) was received at PSTN/ISDN node 330, the stored bearer type data was checked in order to determine what switch was on the incoming side to PSTN/ISDN node 330. Further, the bearer type data stored for the outgoing point (e.g., based on B-Subscriber number) is similarly checked, and if the stored data indicates that both incoming and outgoing sides have an ATM bearer, the PSTN/ISDN node 330 can conclude that ATM node 340 is to be operated (e.g., utilized). In addition, data received in the SETUP message (particularly the B-subscriber number) is analyzed to determine that the called party (destination) terminal $324_{D-P}$ can be reached by contacting PSTN/ISDN node $330_2$. The PSTN/ISDN node $330_1$ realizes that it has an SS#7 signaling interface 300c to PSTN/ISDN node $330_2$, and therefore selects a free CIC (e.g., a CIC not used by any other call) for use toward PSTN/ISDN node $330_2$.

If, on the other hand, the stored bearer type data had indicated an STM bearer, both PSTN/ISDN node 330 and ATM node 340 have to be operated. Thus, PSTN/ISDN node 330 and ATM node 340 collectively function as a gateway between the STM and ATM worlds. Upon realizing that further signaling for the call will be routed through ATM nodes, in the embodiments) of the invention shown in FIG. 3 and FIG. 3A, the PSTN/ISDN node $330_1$ makes reference to an STM/GPN translation table 339 maintained by processor(s) 332 (see event E-9). Two translations are performed using the STM/GPN translation table 339. As a first translation, the information (e.g., b-channel and access information in the case of ISDN or CIC plus signaling system #7 point codes in the case of PSTN) contained in the SETUP message is translated to a global position number (GPN). As a second translation, the CIC and destination point code for a circuit leading to hybrid node pair 330/340 is translated to another global position number (GPN).

In connection with the foregoing, the global position number (GPN) is a common way to identify the connection points, and as such is understood by the pair of nodes (PSTN/ISDN node 330 and ATM node 340). In other words, the GPN is an address, or reference, or system internal pointer known by both PSTN/ISDN node 330 and ATM node 340, and used to translate between port/VP/VC and circuit switch address. Usage of GPN in the embodiment of FIG. 3 and FIG. 3A thereby obviates the sending of real addresses between PSTN/ISDN node 330 and ATM node 340. Advantageously, GPN can be shorter, meaning that there is less data to send. For traditional PSTN, the GPN uniquely corresponds to the 64 kbit voice on a two-wire line, but for ISDN, the GPN corresponds to a b-channel (which may be used by several subscribers).

Then, as event E-10, the PSTN/ISDN node 330 generates an ATM switch control message intended to setup a physical connection in ATM node 340. This message of event E-10 contains the two global position numbers (GPNs) obtained from STM/GPN translation table 339 at event E-9, together with an order for the ATM node 340 to connect the two GPN addresses in ATM switch fabric 345. The PSTN/ISDN node 330 sends the switch control message generated at event E-10 to processor 342 of ATM node 340 over interface 300a, as shown by event E-11.

Upon reception of the switch control message sent as event E-11 to ATM node $340_1$, as indicated by event E-12, main processor 342 consults GPN/ATM translation table 349 in order to translate the two global position numbers (GPNs) contained in the event E-10 switch control message into VP/VC/port information understood by ATM node $340_1$. That is, the two global position numbers (GPNs) are used to obtain VP/VC/port information for ultimately reaching both the origination terminal ($324_{O-P}$) and the destination terminal ($324_{D-P}$). Upon successful translation of GPN to ATM, and assuming sufficient resources, processor 342 of ATM node $340_1$ sets up a path through ATM Switch 345 and reserves resources on the port (trunk or link 341) for the call from terminal $324_{O-P}$ to terminal $324_{D-P}$. The path set up and resource reservation activities are accomplished using switch/reservation control 343 and are collectively illustrated as event E-13 in FIG. 3.

Since PSTN/ISDN node 330 preferably knows whether ATM node $340_1$ was successful in performing a GPN/ATM translation, a successful translation message is sent over interface 300a as event E-14 from ATM node $340_1$ to PSTN/ISDN node $330_1$. If the GPN/ATM translation is not successful at ATM node $340_1$, or if there are no available resources at ATM node $340_1$, a call rejection message is sent back to the originating terminal. After PSTN/ISDN node 330 receives the confirmatory message of event E-14 (that ATM switch 345 has been setup and link reservations made (in accordance with event E-13)), at event E-15 the PSTN/ISDN node $330_1$ prepares and sends its further signaling message (e.g., ISUP or TUP) toward the PSTN/ISDN node at the other end (e.g., PSTN/ISDN node $330_2$). This further signaling message is shown as event E-15 in FIG. 3A. The signaling of event E-15 (e.g., an ISUP or TUP message) includes a message transfer part (MTP), and can be sent out on a timeslot (e.g., 64 kb/s) which carries the SS#7 signaling.

As the signaling of event E-15 arrives at ATM node $340_1$, the ATM node $340_1$ prepares its ATM cell-formatted version of the signaling. In particular, the translator 370 puts the signaling information of the signaling of event E-15 into the payload of one or more ATM cells. For example, the translator 370 is configured to take the 64 kb/s signaling information bit stream and to pack it into ATM cells with a predefined VP, VC, and a physical port. As also indicated as event E-15, the ATM cell-formatted version of the further signaling message is routed through ATM cell switch 345 and onto a link indicated by the VP/VC/port information obtained from the translation. In particular, in FIG. 3A the ATM cell-formatted version of the further signaling message is transported on ATM physical link 341, as shown by event E-16.

Upon reaching ATM node $340_2$, the ATM cell-formatted version of the further signaling messages obtains a new internal VPI/VCI for the ATM cell switch 345 of ATM node $340_2$, and is routed (as indicated by event E-17) through ATM cell switch 345 of ATM node $340_2$ to a circuit emulator (not explicitly shown) in ATM node $340_2$ which is analogous to circuit emulator 370 in ATM node $340_1$. The circuit emulator of ATM node $340_2$ performs the conversion from ATM to STM format in like manner as circuit emulator 370 in ATM node $340_1$, and then passes the signaling message to PSTN/ISDN node $330_2$ as event E-18.

In PSTN/ISDN node $330_2$, the ISUP message is received together with the CIC value (from the message transfer part (MTP)) and the B-subscriber number (which is included in the ISUP message). As indicated by event E-19, the second hybrid node $330_2/340_2$ also performs an analysis of the B-subscriber number and concludes that the B-subscriber number is associated with terminal $324_{D-P}$, which involves B channels. The PSTN/ISDN node $330_2$ then selects a B-channel which can be used to reach terminal $324_{D-P}$, or negotiates with the terminal $324_{D-P}$ as to which B-channel to use (depending on the terminal type and protocol type ISDN or PSTN). The PSTN/ISDN node $330_2$ also signals terminal $324_{D-P}$ to activate a ringing signal (as indicated by event E-20). When an answer is received from terminal $324_{D-P}$ (or during or before receiving an answer), the PSTN/ISDN node $330_2$ consults its STM/GPN translation table 339 (not explicitly shown) using a CIC value and a B-channel. The PSTN/ISDN node $330_2$ then operates the ATM switch 345 (not explicitly shown) of ATM node $340_2$ in the same manner as described for ATM node $340_1$, as indicated by event E-21.

Operation of ATM switch 345 of ATM node $340_2$ allows in-band data (e.g., voice data) carried in ATM packets to be passed through the ATM switch. Such operation is accomplished in like manner as described previously hereinabove (e.g., by consulting a table such as table 339, by sending an ATM switch control message, by consulting a table such as table 349, and by setting up of a path in the ATM switch). When an ATM switch is operated as described above, the resulting path through both ATM switches (carrying in-band information) has to be set up in the same way at both ends. This implies that encapsulation of in-band information (which is controlled by circuit emulation (e.g., circuit emulation 370)) at the two end points of the path is preferably set up in the same way. To minimize delay, AAL2 is preferably utilized by circuit emulation 370 for the encapsulation, although other types of protocols may be alternatively used.

As noted hereinabove, a bearer type is associated with a connection and stored in the application software of the PSTN/ISDN node 330. It is presumed that the PSTN/ISDN node 330 already is able to handle traditional access points (subscriber or network interfaces) connected to STM circuit switches. In so doing, the PSTN/ISDN node 330 has logical representations of these existing access points in a static data structure of the PSTN/ISDN node 330. In accordance with certain embodiment(s) of the invention, the PSTN/ISDN node 330 additionally handles access points connected to the ATM switch. In this regard, see (for example) interface 341 of FIG. 3C (hereinafter described). Thus, for certain embodiment(s) of the invention, the PSTN/ISDN node 330 has logical representations of these additional access points in its static data structure. Therefore, the bearer type data may be employed in the prior discussion as a way of distinguishing the logical representation of the additional access points (e.g., ATM-related access points) in the static data structure from the logical representation of the traditional access points.

It was also noted hereinabove that encapsulation of in-band information is preferably set up the same way at both ends. More specifically, a same type of cell filling is preferably employed by two circuit emulation devices that are connected together. For example, if on a link connecting two circuit emulation devices an ATM cell is packed with only one voice sample by a first of the circuit emulation devices, the second of the circuit emulation devices preferably packs ATM cells in a similar manner. Alternatively, another emulation and/or bridging mechanism or scheme may be employed.

In the above regard, filling only part of an ATM cell with information is a technique for reducing delays, although it may increase overhead. Another way of reducing delay is employment of the AAL2 protocol. As understood by those skilled in the art, AAL2 is a protocol layer on top of ATM, and it allows transport of mini-cells within ATM cells. Usage of the smaller AAL2 cells helps address bandwidth and delay problems in the air interface. Certain embodiment(s) of the invention may be utilized with AAL2 switching as an alternative to ATM switching. If one implements AAL2 in certain embodiment(s) of the invention, the switch 345 operates as an AAL2 switch and GPN/ATM translation table 349 in ATM node 340 preferably also includes an AAL2 pointer. Whenever the ingress and egress point is referenced, it can alternately include an AAL2 pointer. Thus, as used herein and in the appended claims, ATM encompasses ATM-related protocols on top of ATM, such as AAL2. It should also be understood that the term "broadband", as used herein and in the appended claims, embraces and encompasses packet-switched technologies in general (e.g., IP, VoIP, Frame-relay, ATM, etc.).

Figure 3B:
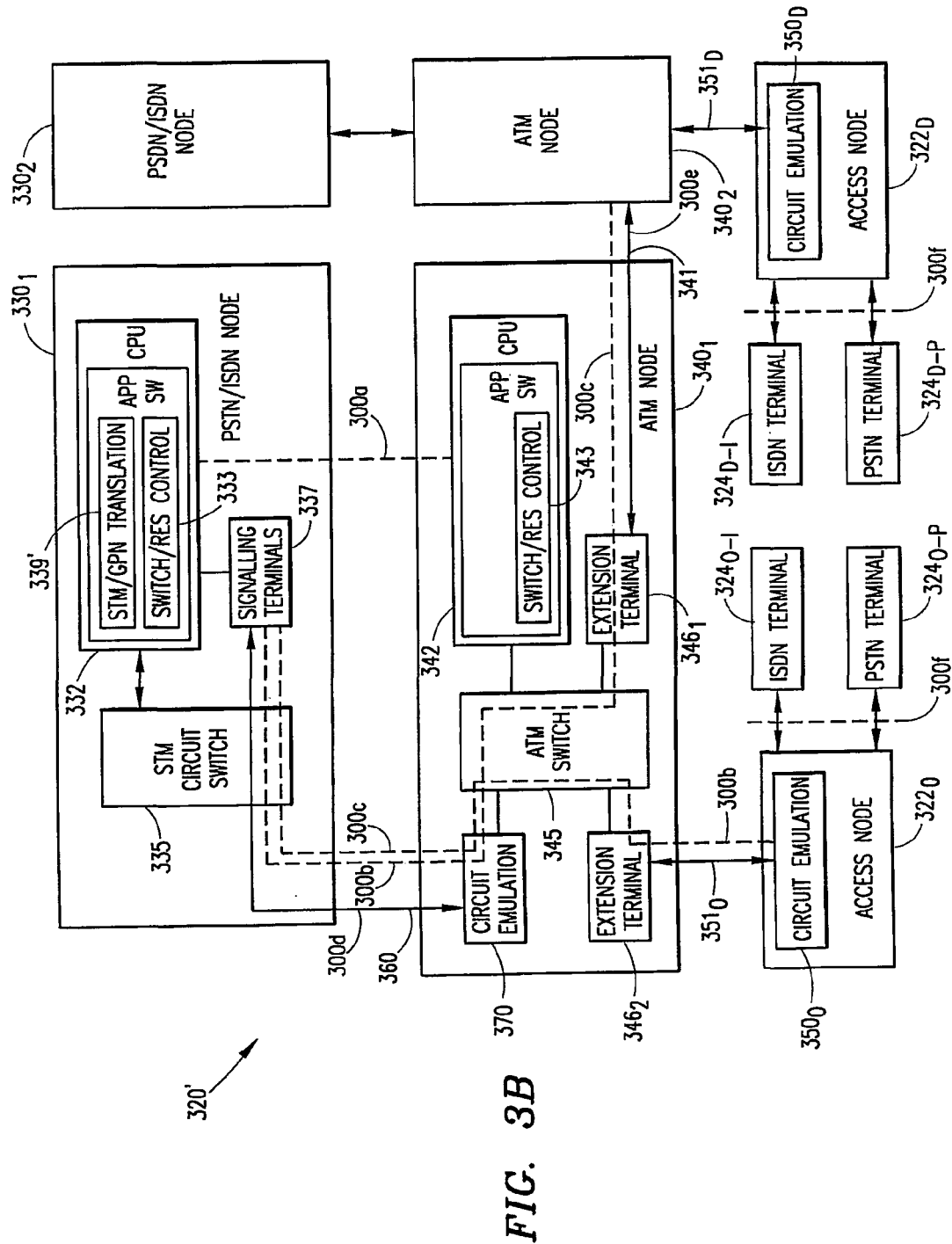
FIG. 3B illustrates an exemplary schematic view of a hybrid STM/ATM network according to another embodiment of the invention.

Referring now to FIG. 3B, an exemplary hybrid STM/ATM network 320' according to another embodiment of the invention is illustrated. The embodiment of FIG. 3B primarily differs from the embodiment of FIG. 3 in that the embodiment of FIG. 3B does not employ global position numbers (GPNs). Rather, the embodiment of FIG. 3B uses an ATM/STM translation table 339' in processor 332 of PSTN/ISDN node $330_1$ instead of an GPN/ATM translation table. In the embodiment of FIG. 3B, the translation tables in the circuit emulation $350_0$ translate the SETUP message from a 64 kb/s speech channel to an ATM address (VP and VC) in a manner similar to that of event E-2 in the embodiment(s) of FIG. 3 and FIG. 3A. After routing of the translated SETUP message through ATM switch $345_1$, the circuit emulation 370 translates the SETUP message to the STM format as occurred at event E-5 of the embodiment(s) of FIG. 3 and FIG. 3A.

The embodiment of FIG. 3B also differs from that of the embodiment(s) of FIG. 3 and FIG. 3A in that processor 332 of PSTN/ISDN node 330 terminates the narrowband signaling by translating a narrowband reference point (e.g., b-channel if an ISDN connection) to a corresponding ATM address for use by ATM node 340. Thus, for the FIG. 3B embodiment, the switch control message of event E-11 sends the ATM VP/VC/port information understood by ATM node $340_1$. Thus, the translation of event E-12 of the FIG. 3/FIG. 3A embodiment is unnecessary in the FIG. 3B embodiment. Rather, upon receiving the ATM VP/VC/port information in the switch control message of event E-11, the embodiment of FIG. 3B proceeds to the path set up and resource reservation operations denoted as event E-13.

The principles as illustrated in the embodiments hereof are also applicable to the carrying of other types of signaling messages in ATM cells. Included among such other types of signaling messages are those destined for the originating terminal (e.g., a call completion signaling message), in which case some of the events described herein are performed essentially in reverse order.

Figure 3C:
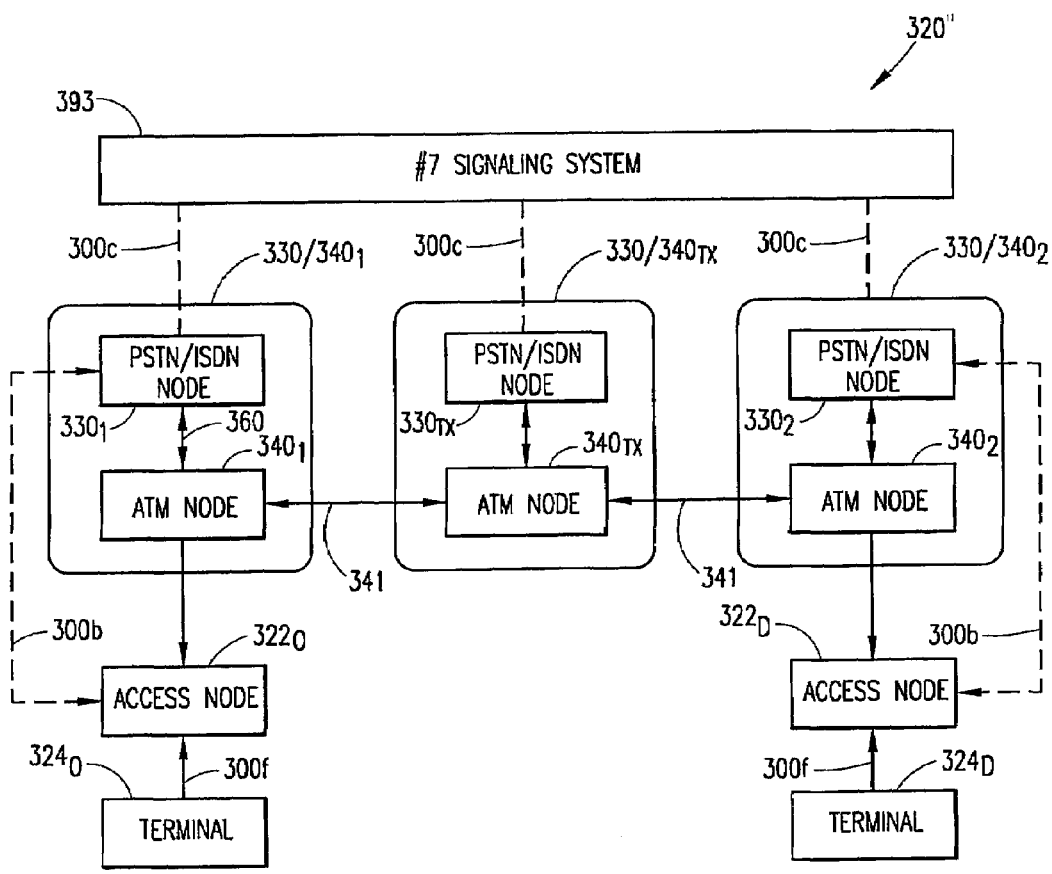
FIG. 3C illustrates an exemplary schematic view showing a transit hybrid node pair of the invention connected between two local exchange hybrid node pairs of the invention.

Referring now to FIG. 3C, an exemplary illustration of how hybrid node pairs 330/340 of the invention may be arranged in an exemplary hybrid STM/ATM network 320" is presented. Network 320" has three node pairs 330/340, including a transit exchange hybrid node pair $330/340_{TX}$ between two local exchange hybrid node pairs $330/340_1$ and $330/340_2$. FIG. 3C shows provision of a "#7 signaling system" 393, which is a logical system carried in the ATM network on an ATM AAL layer as described above. As an alternative embodiment, the "#7 signaling system" 393 may be provided with its own physical network.

Referring now to FIG. 3D, a diagrammatic view of an exemplary protocol usable between two elements of a network in accordance with embodiment(s) of the invention that include hybrid node pairs is illustrated. The ATM node 340 with its ATM switch 345 terminates the ATM and AAL1 (circuit emulation part) layers; the PSTN/ISDN node 330 terminates the MTP and ISUP layers.

Referring now to FIGS. 3E, 3F, and 3G, diagrammatic views of alternate exemplary protocols between two elements, a first of the network elements having a hybrid node pair in accordance with embodiment(s) of the invention, and a second of the network elements being an access node with an additional ATM interface with circuit emulation is illustrated. In the first network element, the ATM switch 345 terminates the ATM and AAL1 (circuit emulation part) layers, while the layers above are terminated by the PSTN/ISDN node 330. In the second network element, the ATM interface and circuit emulation addition to the access node terminates the ATM and AAL1 layers, while the layers above are terminated by the connected terminal and the access node part. The exemplary protocols of FIGS. 3E, 3F, and 3G can be used, for example, on the interface 300b.

Figure 3H:
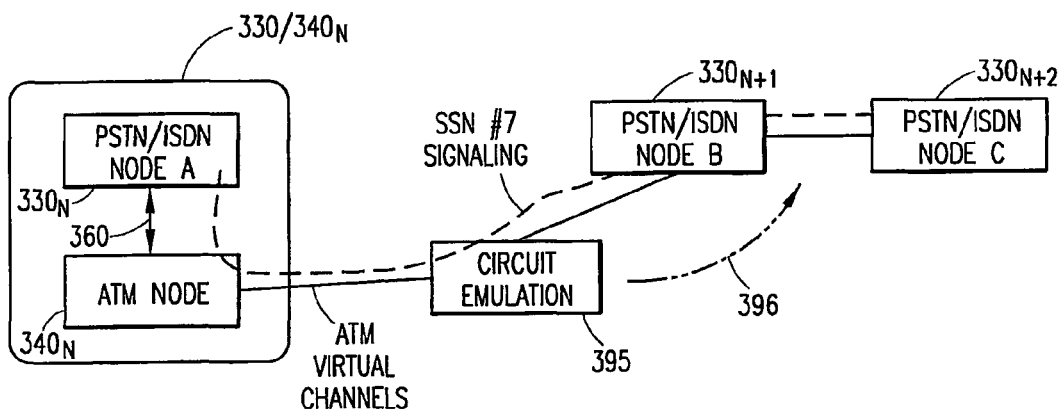
FIG. 3H illustrates an exemplary diagrammatic view showing gradual upgrading of a network from a traditional narrowband STM-transported-and-switched environment into an environment with a hybrid STM/ATM network in accordance with embodiment(s) of the invention.

Referring now to FIG. 3H, an exemplary gradual upgrade of a network from a traditional narrowband STM-transported-and-switched environment into the environment (e.g., hybrid STM/ATM network 320) of certain embodiment(s) of the invention is illustrated. In FIG. 3H, the circuit emulation equipment (translator) 395 separates the hybrid environment from the pure STM environment. If node B (PSTN/ISDN node $330_{N+1}$) is upgraded with ATM switching and (signaling and traffic) transport according to certain embodiment(s) of the invention, the node C (PSTN/ISDN node $330_{N+2}$) is not disturbed if the circuit emulation equipment (translator) 395 is moved in between nodes B and C in the manner illustrated by the dotted-dashed line 396 as shown in FIG. 3H.

Figure 3I:
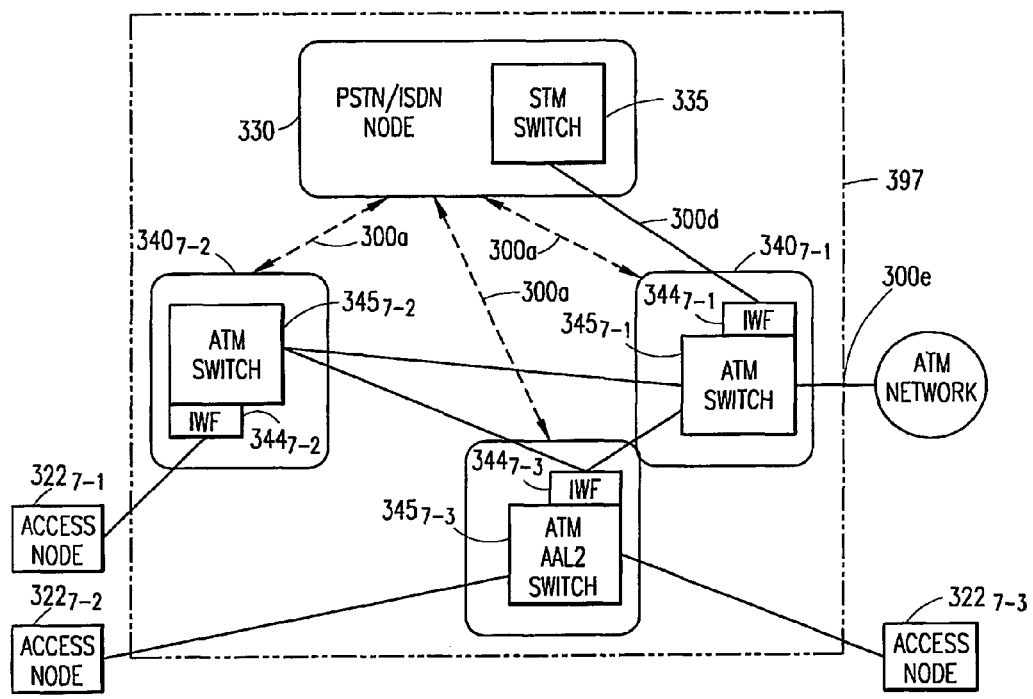
FIG. 3I illustrates an exemplary schematic view showing a multi-switch hybrid node according to yet another embodiment of the invention.

Referring now to FIG. 3I, certain embodiment(s) of the invention permit the possibility of one logical node to include many switches, with switching logic within the node coordinating the setting up of paths through the switches. This logic also inserts interworking functions (IWFs) between switches (if needed), and makes it possible to use resources independent on which switch they are allocated to. For example, the multi-switch node 397 of certain embodiment(s) of the invention includes the PSTN/ISDN node 330 with its STM switch 335, connected by interface 300d to ATM node $340_{7-1}$. Specifically, connection is made through IWF $344_{7-1}$ to ATM switch $345_{7-1}$ of ATM node $340_{7-1}$. The ATM switch $345_{7-1}$ of ATM node $340_{7-1}$ is connected by interface 300e to an ATM network, as well as to ATM node $340_{7-2}$ and ATM node $340_{7-3}$ included in the multi-switch node 397. The ATM node $340_{7-2}$ has a switch $345_{7-2}$ and an IWF $344_{7-2}$, through which connection can be made with access node $322_{7-1}$. The ATM node $340_{7-3}$ has an ATM AAL2 switch $345_{7-3}$, which connects to ATM nodes $340_{7-1}$ and $340_{7-2}$ through IWF $344_{7-3}$ of ATM node $340_{7-3}$. Access nodes $322_{7-2}$ and $322_{7-3}$ are connected to ATM AAL2 switch $345_{7-3}$ of ATM node $340_{7-3}$.

Certain embodiment(s) of the invention advantageously reuse PSTN and ISDN software in the PSTN/ISDN nodes 330 in a fairly simple way. That is, already-developed narrowband application software residing in the PSTN/ISDN nodes 330 can be utilized, while on-demand ATM connections are used as traffic bearers. The invention thus allows a PSTN/ISDN node such as PSTN/ISDN node 330 to control the call, which facilitates use of well-proven software for various services and functions (e.g., subscriber services, intelligent network (IN) services, Centrex, Charging Customer Care systems, etc.).

ATM is thus used as a transport and switching mechanism in certain embodiment(s) of the invention, while the signaling remains normal narrowband signaling. The narrowband signaling is transported on permanent paths over ATM connections, and the narrowband speech channels are transported on ATM, and switched on a "per call basis" (e.g., on-demand) through an ATM switch.

The narrowband application software executed by processor(s) 332 of PSTN/ISDN nodes 330 thus acts as if operating on its STM circuit switched transport, when in fact it is actually operating on an ATM cell switch. It should be understood that the ATM switch may reside in a separate ATM node or may be integrated in the same node as the STM switch. On a "per call basis", the switching logic in the PSTN/ISDN nodes 330 requests the switching logic in the ATM nodes 340 to be set up and disconnected through an ATM cell switch.

It should be understood that variations of the foregoing are within the scope of the embodiments of the invention. For example, the circuit emulation 370 is shown (e.g., in FIG. 3) as being provided on a device board of ATM node 340. Alternatively, circuit emulation 370 may be located elsewhere, such as (for example) on link 360 between PSTN/ISDN node 330 and ATM node 340, or even included in PSTN/ISDN node 330 (e.g., at either end of interface 300d). While various processors, such as processors 332 and 342, have been illustrated as single processors, it should be understood that the functionality of such processors may be situated or distributed in different ways (e.g., distributed over several processors to achieve, e.g., scalability in respect to processing capacity and reliability), for example.

In the foregoing examples, the SETUP message (received at the STM node in STM format) is routed through STM circuit switch 335 as indicated by the event E-8 to signaling terminals 337. It should be understood, however, that depending upon implementation in an PSTN/ISDN node, signaling may take another way to reach a signaling terminal (e.g., other than through a switch). The invention also describes a system with one STM switch and one ATM switch associated with one another. This particular configuration is advantageous in that resources which take care of certain kinds of signals (e.g., in-band signals) may be situated in the STM switch and be used also for the ATM transported calls. This is also a way of reusing the installed base, if such exists. Also, certain embodiment(s) of the invention can perform switching on various levels, such as the AAL2 level and with mini-cells, which tends to reduce any delay/echo problems.

The invention thus pertains to the telecommunications world and an attempt to introduce ATM to a telecommunications network. The invention addresses the situation in which a circuit switched telephony network pre-exists, and it is to be augmented or partially replaced by parts that employ ATM for transport and switching. Certain embodiment(s) of the invention need not employ broadband signaling, but rather narrowband signaling with the bearer part of the call following the signaling to the same extent as in a traditional narrowband circuit switched network.

As described herein, ATM may be used as a transport and switching mechanism in a hybrid STM/ATM network, while the signaling remains normal narrowband signaling. The narrowband signaling may be transported on permanent paths over ATM connections, and the narrowband speech channels may be transported on ATM and switched on a "per call basis" (e.g., on-demand) through an ATM switch. The hybrid STM/ATM network may include an access node that services narrowband terminals and which generates a signaling message in connection with call setup. A translator formats the first signaling message into ATM cells so that the first signaling message may be routed through an ATM switch to a circuit switched (e.g., STM) node. The circuit switched node (e.g., PSTN/ISDN) sets up a physical connection for the call and generates a further signaling message for the call, the further signaling message pertaining to the physical connection. The ATM switch routes an ATM cell-formatted version of the further signaling message to another ATM switch over an ATM physical interface. Thus, the ATM switch switches both narrowband traffic and signaling for the call over the ATM physical interface.

Figure 4:
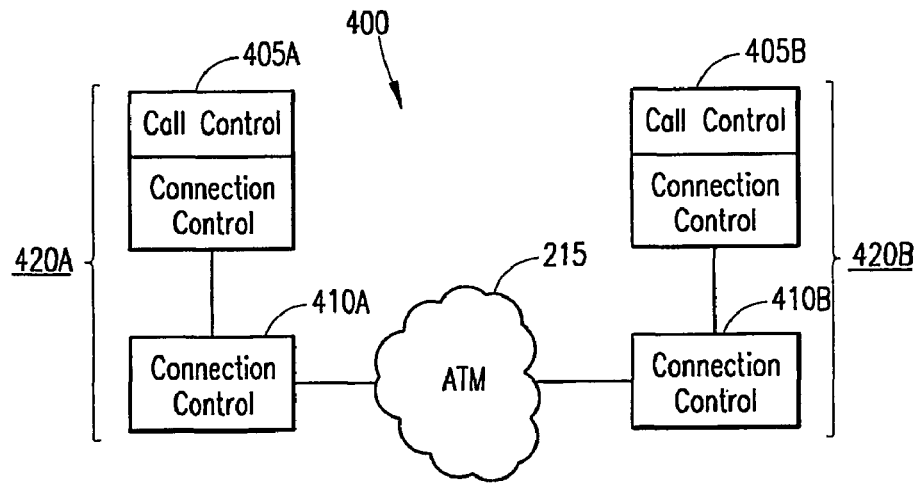
FIG. 4 illustrates another exemplary scheme for utilizing a broadband network in conjunction with nodes having partially separated functions in accordance with the present invention.

Referring now to FIG. 4, another exemplary scheme for utilizing a broadband network in conjunction with nodes having partially separated functions in accordance with the present invention is illustrated generally at 400. The nodes 405A,405B are connected to the nodes 410A,410B. The nodes 405A,405B each include both call control functions and connection control functions. In effect, each of the nodes 405A,405B (e.g., which may correspond to, for example, PSTN/ISDN nodes 330 of the embodiment(s) of FIGS. 3 et seq.) include both switching intelligence (e.g., which may correspond to, for example, one or more of processor(s) 332, switch and resource control software 333, signaling terminals 337, and STM/GPN translation table 339 of the embodiment(s) of FIGS. 3 et seq.) and switching fabric (e.g., which may correspond to, for example, an STM circuit switch 335 of the embodiment(s) of FIGS. 3 et seq.). While the nodes 410A,410B include connection control functions, they rely on the call control functions of the nodes 405A,405B to which they are respectively connected. In effect, each of the nodes 410A,410B (e.g., which may correspond to, for example, ATM nodes 340 of the embodiment(s) of FIGS. 3 et seq.) include switching fabric (e.g., which may correspond to, for example, an ATM cell switch 345 of the embodiment(s) of FIGS. 3 et seq.). The nodes 410A,410B, which are also connected to an ATM network 215, effect required emulation and cell packing for interworking a narrowband network (not shown) with the ATM network 215.

Generally, and in certain embodiment(s), call control involves features, functions, responsibilities, etc. pertaining to one or more of the following: routing a call; signaling between narrowband nodes; providing subscriber services; implementing charging; determining the connection and/or activation of tone senders, answering machines (e.g., voice mail), echo cancelers, and other types of telephony resources and/or equipment; ascertaining the desirability and/or necessity of utilizing an IN service; etc. Connection control, on the other hand, involves features, functions, responsibilities, etc. pertaining to setting up/establishing a connection between two (or among/across multiple) physical points within a switch and/or over a network responsive to call control, for example. The connection control, to effectuate such a connection, may rely on some type of signaling of the bearer network (e.g., UNI, PNNI, B-ISUP, etc.)

In accordance with certain embodiment(s) of the present invention, the nodes 405A, 405B may be advantageously realized using, at least partly, a modified version of an existing telecommunications switch. Using an existing telecommunications switch advantageously obviates any need to create code "from scratch" for the myriad of advanced calling features that are already supported by the existing telecommunications switch. Furthermore, in accordance with certain principles of the present invention, using an existing telecommunications switch enables a gradual migration to a broadband transport mechanism such as ATM. A call/connection control node 405A,405B and a respective connection control node 410A,410B pair together form a hybrid switch 420A/420B.

Figure 5:
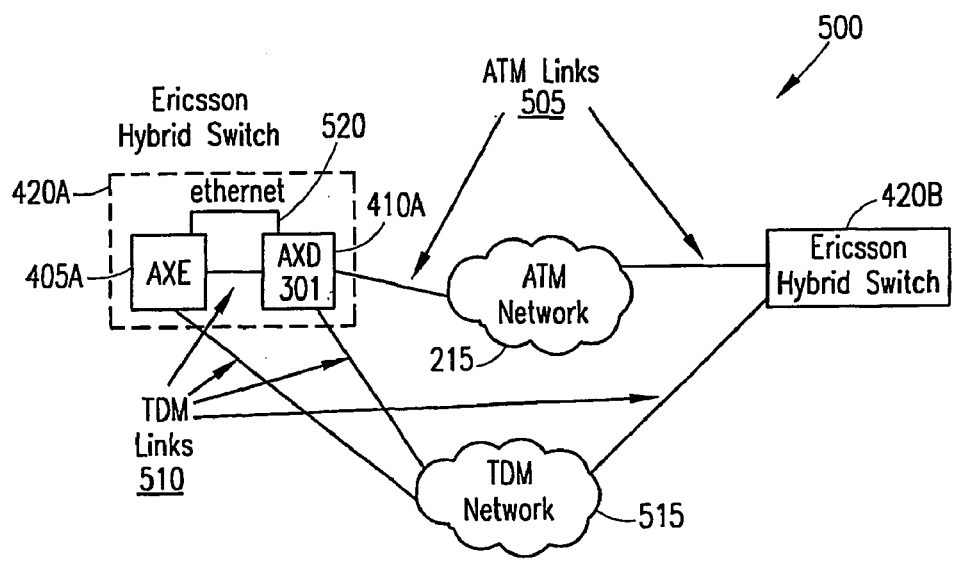
FIG. 5 illustrates yet another exemplary scheme for utilizing a broadband network in conjunction with nodes having partially separated functions in accordance with the present invention.

Referring now to FIG. 5, yet another exemplary scheme for utilizing a broadband network in conjunction with nodes having partially separated functions in accordance with the present invention is illustrated generally at 500. The two hybrid switches 420A,420B are illustrated as being connected to the ATM network 215 by ATM links 505 (e.g., which may correspond to, for example, one or more of interface 300c, interface 300e, and ATM physical link 341 of the embodiment(s) of FIGS. 3 et seq.), e.g., via a connection control node 410. Each of the call/connection control node 405A and the connection control node 410A are connected to a Time Division Multiplexed (TDM) network 515 by TDM links 510 (e.g., which may correspond to, for example, interface 300d of embodiment(s) of FIGS. 3 et seq. [including alternative embodiment(s) of FIGS. 3 et seq. as described hereinabove with reference to the interface 300d of FIG. 3]; as well as interface 300b/link 351, interfaces 300b,300c, and/or interface 300d/switch-to-switch link 360). The TDM network 515 may correspond to any of many so-called narrowband networks such as PSTN, PLMN, ISDN, etc. As indicated within the hybrid switch 420A, the call/connection control node 405A is connected to the connection control node 410A via a TDM link 510 (e.g., which may correspond to, for example, interface 300b, interface 300c, interface 300d, switch-to-switch link 360, etc. of FIGS. 3 et seq.) and an ethernet link 520 (e.g., which may correspond to, for example, interface 300a, interface 300b, interface 300c, switch-to-switch link 360, etc. of FIGS. 3 et seq.).

The hybrid switch 420 advantageously enables an existing switch in conjunction with an associated switch to facilitate the transport of call connections at least partly across a broadband network, such as the ATM network 215. As illustrated in the scheme 500, the existing switch may be realized using, for example, an AXE switch (available from Ericsson Inc.), and the associated switch may be realized using, for example, an AXD 301 switch (also available from Ericsson Inc.). Thus, the hybrid switches 420A,420B may be realized using, for example, an Ericsson Hybrid Switch (also available from Ericsson Inc.).

Figure 6:
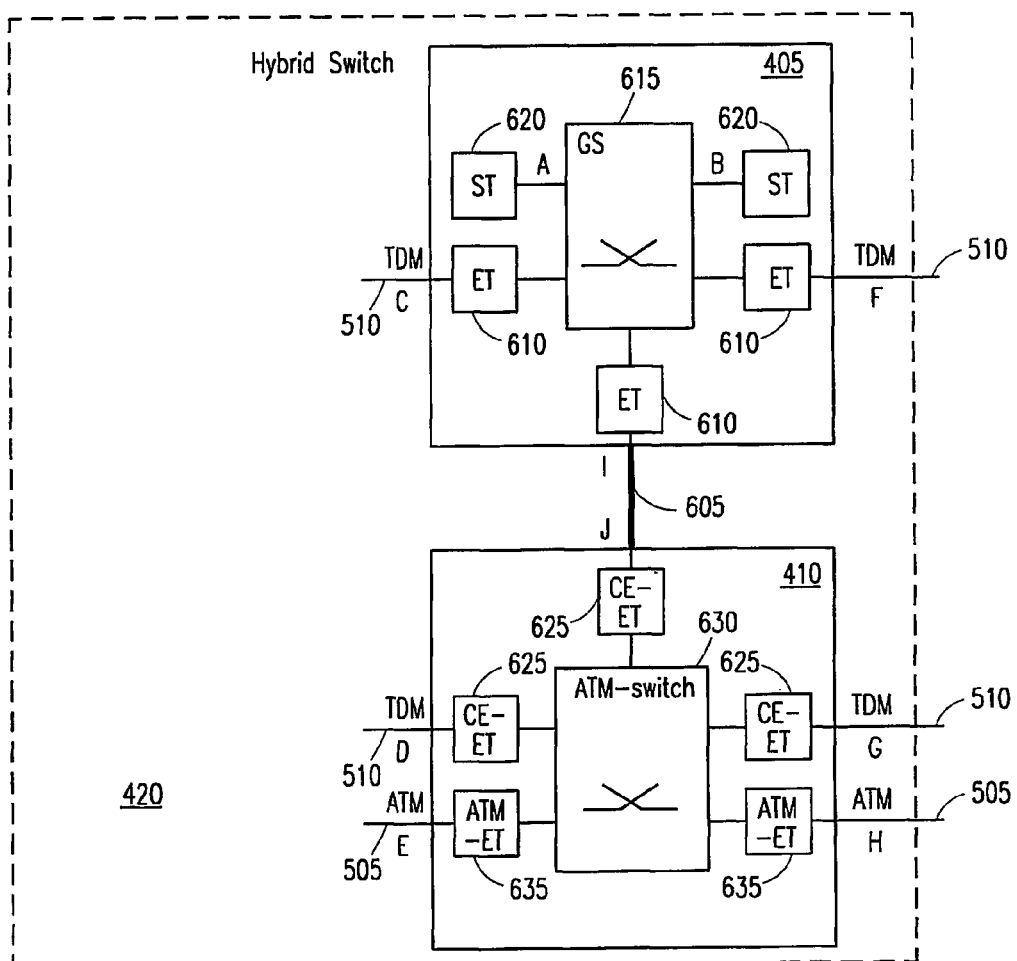
FIG. 6 illustrates another exemplary hybrid switch with multiple ports for switching a connection in accordance with the present invention.

Referring now to FIG. 6, another exemplary hybrid switch with multiple ports for switching a connection in accordance with the present invention is illustrated generally at 420. The hybrid switch 420 includes a call/connection control node 405 and a connection control node 410 that are connected by linkage 605 (e.g., which may correspond to, for example, one or more of interface 300a, interface 300b, interface 300c, interface 300d, and switch-to-switch link 360 of the embodiment(s) of FIGS. 3 et seq.). It should be noted that the thick line representing the linkage 605 indicates that the linkage 605 may be composed of more than one link. Information exchange across linkage 605 permits the call/connection control node 405 to switch narrowband calls across the switching fabric of the connection control node 410. Such information exchange enables 64 kbit/sec, narrowband calls originating and terminating in narrowband networks (e.g., one or more TDM networks 515) to be trunked over broadband networks (e.g., one or more ATM networks 215) between hybrid switches 420. It should be noted that TDM as used herein, including the claims, encompasses and embraces time-division multiplexed protocols in general, and it is not limited to any particular TDM protocol.

The call/connection control node 405 includes input/outputs (I/Os) for two TDM links 510. Each TDM link 510 terminates at exchange termination (ET) equipment 610. Each ET equipment 610 is connected to a group switch (GS) 615 (e.g., which may correspond to, for example, the STM circuit switch 335 of the embodiment(s) of FIGS. 3 et seq.). Each ET equipment 610 receives from the GS 615 data samples taken from multiple calls and multiplexes this data into a stream of data sent out over a TDM link 510 that connects the hybrid switch 410 to another node. The ET equipment 610 also receives data from other nodes over the TDM link 510 and de-multiplexes this data into samples from separate calls to be transferred to the GS 615. The GS 615 is also connected to one or more signaling terminals (STs) 620 (e.g., which may correspond to, for example, the signaling terminals 337 of the embodiment(s) of FIGS. 3 et seq.). The linkage 605 may include a TDM link 510 (not explicitly shown in FIG. 6) that connects an ET equipment 610 of the call/connection control node 405 with a circuit emulation-ET (CE-ET) equipment 625 (e.g., which may correspond to, for example, the circuit emulation/translator 370 of the embodiment(s) of FIGS. 3 et seq.) of the connection control node 410.

The connection control node 410 includes I/Os for two TDM links 510. Each TDM link 510 terminates at CE-ET equipment 625 (e.g., which may correspond to, for example, the extension terminal ET 346$_2$ (optionally in conjunction with the circuit emulation/translator 350) of the embodiment(s) of FIGS. 3 et seq.). Each CE-ET equipment 625 is connected to an ATM switch 630 (e.g., which may correspond to, for example, the ATM switch 345 of the embodiment(s) of FIGS. 3 et seq.). The CE-ET equipment 625 terminates a TDM link 510 for the ATM switching fabric of the connection control node 410 by using circuit emulation. The circuit emulation, e.g., hardware on a CE-ET equipment 625 maps time slots from an E1 line into, for example, single streams of ATM adaptation layer 1 (AAL1) cells. The CE-ET equipment 625 maps successive octets from a single time slot to a single stream of AAL1 cells. The ATM switch 630 is also connected to one or more ATM-ET equipments 635 (e.g., which may correspond to, for example, the extension terminal ET 346$_1$ of the embodiment(s) of FIGS. 3 et seq.). Each ATM-ET equipment 635 terminates an ATM link 505 to the ATM switching fabric of the connection control node 410.

The various ports/interfaces of the call/connection control node 405 and the connection control node 410 enable the establishment of various connection paths in the hybrid switch 420. Connection paths may be established across the following exemplary points as enumerated in Table 1:

TABLE 1

Connection Paths Establishable for FIG. 6.

(1) point A - (I, J) - G
(2) point A - (I, J) - H
(3) point D - (J, I) - B
(4) point E - (J, I) - B
(5) point C - (I, J) - G
(6) point C - (I, J) - H
(7) point D - (J, I) - F
(8) point D - G
(9) point D - H
(10) point E - (J, I) - F
(11) point E - G
(12) point E - H Table 1—Connection Paths Establishable for FIG. 6. Taking connection path "(6) point C-(I, J)-H", for example, a connection may be established from point "C" at the TDM link 510, through two ET equipments 610 and the GS 615, to point "I". The connection continues from point "I" across the linkage 605 to point "J". The connection continues further from point "J" through a CE-ET equipment 625, the ATM switch 630, and the ATM-ET equipment 635 to point "H" at the ATM link 505.

Figure 7:
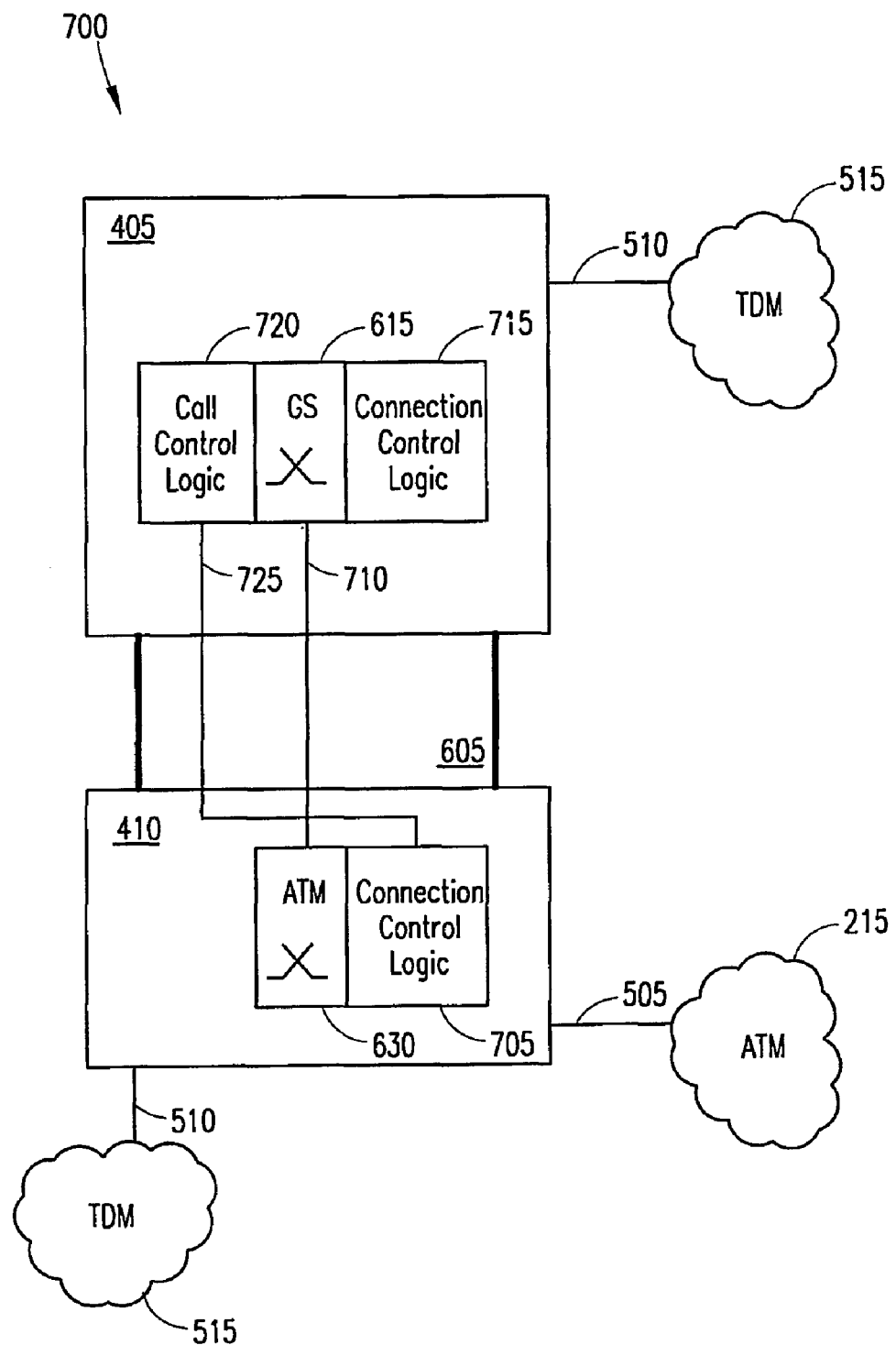
FIG. 7 illustrates a simplified block diagram of an exemplary hybrid switch in accordance with the present invention.

Referring now to FIG. 7, a simplified block diagram of an exemplary hybrid switch in accordance with the present invention is illustrated generally at 700. The hybrid switch at 700 includes a call/connection control node 405, which is shown connected to a TDM network 515 via a TDM link 510, and a connection control node 410, which is shown connected to a TDM network 515 via a TDM link 510 and an ATM network 215 via an ATM link 505. The call/connection control node 405 is connected to the connection control node 410 via the linkage 605, which may include one or more links. The connection control node 410 includes connection control logic 705 and the ATM switch 630. The connection control logic 705 may be composed of, for example, hardware, software, firmware, some combination thereof, etc.

The ATM switch 630 is connected via link 710 to the GS 615 of the call/connection control node 405. The link 710 may be utilized to transfer data information between the ATM switch 630 and the GS 615. The call/connection control node 405 also includes connection control logic 715 to enable the call/connection control node 405 to switch calls (e.g., to or through the TDM network 515 directly connected thereto via the TDM link 510) without the aid of the connection control node 410. The connection control logic 715 may also be composed of, for example, hardware, software, firmware, some combination thereof, etc. The call/connection control node 405 further includes call control logic 720, which provides call control functions for the connection control node 410 as well as the call/connection control node 405. The call control logic 720 may also be composed of, for example, hardware, software, firmware, some combination thereof, etc.

The call control logic 720 may provide call control functions to the connection control node 410 by exchanging signaling information over a link 725. (It should be noted that either or both of the links 710 and 725 may be composed of more than one link.) For example, for a call incoming to the connection control node 410 over the TDM link 510 from the TDM network 515, signaling information may be forwarded to the call control logic 720 from the connection control logic 705 over the link 725. The switching intelligence of the call control logic 720 executes applicable call control functions and ascertains relevant call control information (e.g., as explained further hereinabove with reference to FIGS. 3 et seq.). This signaling information is sent from the call control logic 720 over the link 725 to the connection control logic 705, which may thereafter switch the call data information of the incoming call to/through the appropriate network (e.g., the ATM network 215). The call control functions of existing (e.g., STM) switches can therefore be advantageously utilized by newer and faster (e.g., ATM) switches to thereby avoid needing to completely reprogram call control functionality for the newer switches.

It should be emphasized that the call/connection control node 405 is capable of connecting directly to the TDM network 515 over the TDM link 510 via the GS 615. Consequently, a hybrid switch architecture in accordance with the present invention, by combining a call/connection control node 405 with a connection control node 410, enables this logical node to communicate (i) with an existing TDM network 515 (e.g., a PSTN network) using the GS 615 (e.g., an STM switch) and (ii) with a broadband network (e.g., the ATM network 215) over a broadband link (e.g., the ATM link 505) using a broadband switch (e.g., the ATM switch 630). Providing such dual connectivity advantageously enables a network to gradually migrate from a first network protocol (e.g., a narrowband network protocol) to a second network protocol (e.g., a broadband network protocol) while utilizing both existing call control logic (e.g., software, etc.) and existing connections to and within the first network (e.g., a narrowband network).

Although preferred embodiment(s) of the methods, systems, and arrangements of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. An arrangement for combining narrowband and broadband transport mechanisms in a communications network, comprising:
    a first network switch, said first network switch configured to provide call control functions and connection control functions wherein said connection control functions are provided using a narrowband switch fabric and wherein said call control functions are provided using call control applications; and
    a second network switch, said second network switch connected to said first network switch by at least one link, said second network switch configured to provide connection control functions wherein said connection control functions are provided using a broadband switch fabric, and wherein said call control applications within said first network switch further provides call control functions for said second network switch by providing instructions to said broadband switch fabric over said one link.

2. The arrangement according to claim 1, wherein said first network switch is directly connected to said second network switch by the at least one link.

3. The arrangement according to claim 1, wherein said second network switch does not provide call control functions and solely relies on said first network switch for providing said call control functions.

4. The arrangement according to claim 1, wherein said first network switch includes a synchronous transfer mode (STM) switch, and said second network switch includes an asynchronous transfer mode (ATM) switch.

5. The arrangement according to claim 1, wherein said first network switch and said second network switch function together as a single logical node within the communications network.

6. The arrangement according to claim 5, wherein the single logical node comprises a hybrid switch.

7. The arrangement according to claim 1, wherein said first network switch is further connected to a time division multiplexed (TDM) network.

8. The arrangement according to claim 1, wherein said second network switch is further connected to a time division multiplexed (TDM) network and an asynchronous transfer mode (ATM) network.

9. A dual-node system for combining narrowband and broadband transport mechanisms in a communications network, comprising:
    a first network switch, said first network switch including switching intelligence for providing call control functions and narrowband switching fabric for providing call connection functions;
    a second network switch, said second network switch connected to said first network switch by at least one link, said second network switch including broadband switching fabric for providing call connection functions and adapted to transceive control signaling information over the at least one link from said switching intelligence within said first network switch for providing call control functions over said broadband switching fabric; and
    wherein said first network switch and said second network switch function as a single logical node within the communications network.

10. The dual-node system according to claim 9, wherein the at least one link comprises a first link and a second link, each of the first link and the second link operating in accordance with an ethernet protocol.

11. The dual-node system according to claim 9, wherein the signaling information received from said first network switch is utilized by said second network switch in order to switch an incoming call using the switching fabric thereof.

12. The dual-node system according to claim 9, wherein said first network switch comprises a synchronous transfer mode (STM) switch, and said second network switch comprises an asynchronous transfer mode (ATM) switch.

13. The dual-node system according to claim 9, wherein said first network switch is further directly connected to a time division multiplexed (TDM) network, and said second network switch is further connected to the TDM network and an asynchronous transfer mode (ATM) network.

14. The dual-node system according to claim 13, wherein the TDM network comprises at least one of a public switched telephone network (PSTN), a public land mobile network (PLMN), and an integrated services digital network (ISDN).

15. A method for combining narrowband and broadband transport mechanisms in a communications network, comprising the steps of:
  providing a first network switch having switching intelligence for providing call control functionality and a narrowband switch fabric for providing connection control functionality;
  providing a second network switch having a broadband switch fabric for providing connection control functionality;
  connecting the first network switch to the second network; and
  providing call control functionality within said second network switch by said switching intelligence within said first network switch providing call control instructions to said broadband switch fabric within said second network switch.

16. The method according to claim 15, further comprising the step of transmitting, by the second network switch, incoming signaling information related to an incoming call to the first network switch.

17. The method according to claim 16, further comprising the steps of: receiving, by the first network switch, the incoming signaling information related to the incoming call from the second network switch; executing, by the first network switch, call control functionality with respect to the incoming signaling information related to the incoming call to produce outgoing signaling information; sending, by the first network switch, the outgoing signaling information to the second network switch.

18. The method according to claim 17, further comprising the steps of: receiving, by the second network switch, the outgoing signaling information from the first network switch; switching, by the second network switch, the incoming call responsive to the outgoing signaling information to thereby forward an outgoing call from the second network switch.

19. A system for combining narrowband applications with broadband transport, comprising:
  a first network switch, said first network switch including call control logic for performing call control functionality, a synchronous transfer made (STM) switch, and first connection control logic for performing connection control functionality for said first network switch over said STM switch;
  a second network switch, said second network switch connected to said first network switch and including an asynchronous transfer mode (ATM) switch and second connection control logic for performing connection control functionality for said second network switch over said ATM switch, said second network switch adapted to switch communications via the ATM switch under the control of the second connection control logic responsive to control signaling information received from the call control logic of said first network switch;
  an ATM network, said ATM network directly connected to said second network switch for exchanging communications between said ATM network and said second network switch; and
  a time division multiplex (TDM) network, said TDM network directly connected to said first network switch for exchanging communications between said TDM network and said first network switch.

20. The system according to claim 19, wherein said TDM network is also directly connected to said second network switch for exchanging communications between said TDM network and said second network switch.

21. The system according to claim 19, further comprising: another TDM network, said another TDM network directly connected to said second network switch for exchanging communications between said another TDM network and said second network switch.

* * * * *

UNITED STATES PATENT AND TRADEMARK OFFICE
CERTIFICATE OF CORRECTION

PATENT NO. : 6,980,544 B2 Page 1 of 1
APPLICATION NO. : 09/764622
DATED : December 27, 2005
INVENTOR(S) : Hallenstal et al.

It is certified that error appears in the above-identified patent and that said Letters Patent is hereby corrected as shown below:

In Column 24, Line 5, in Claim 19, delete "made" and insert -- mode --, therefor.

Signed and Sealed this

Twenty-seventh Day of November, 2007

JON W. DUDAS
*Director of the United States Patent and Trademark Office*